(12) United States Patent
Boesch (10) Patent No.: US 7,610,143 B1
(45) Date of Patent: Oct. 27, 2009

(54) ENGINE AUTOSTOP AND AUTORESTART CONTROL

(75) Inventor: Mathew Alan Boesch, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/135,389

(22) Filed: Jun. 9, 2008

(51) Int. Cl.
  *B60T 7/12* (2006.01)
  *G05D 1/00* (2006.01)
  *G06F 7/00* (2006.01)
  *G06F 17/00* (2006.01)

(52) U.S. Cl. .................................................. 701/112

(58) Field of Classification Search ............... 123/179.3, 123/179.4, 198 DB, 456, 491; 701/110, 112
See application file for complete search history.

(56) References Cited

U.S. PATENT DOCUMENTS

| | | | |
|---|---|---|---|
| 4,923,042 A * | 5/1990 | Yamabe et al. ................. | 477/54 |
| 6,532,926 B1 | 3/2003 | Kuroda et al. | |
| 6,679,214 B2 | 1/2004 | Kobayashi et al. | |
| 6,817,329 B2 | 11/2004 | Buglione et al. | |
| 6,881,170 B2 * | 4/2005 | Onoyama et al. ............. | 477/39 |
| 6,908,413 B2 * | 6/2005 | Ayabe et al. ................. | 477/109 |
| 6,913,558 B2 | 7/2005 | Mori et al. | |
| 7,121,234 B2 | 10/2006 | Schmitz et al. | |
| 7,212,910 B2 | 5/2007 | Akasaka | |
| 7,472,016 B2 * | 12/2008 | Takeyama et al. ......... | 123/179.4 |
| 2003/0017912 A1 * | 1/2003 | Shimabukuro et al. ...... | 477/115 |
| 2003/0116134 A1 * | 6/2003 | Kojima ........................ | 123/457 |
| 2006/0207567 A1 | 9/2006 | Yamaguchi et al. | |
| 2008/0092841 A1 * | 4/2008 | Takahashi ................. | 123/179.3 |

\* cited by examiner

*Primary Examiner*—Stephen K Cronin
*Assistant Examiner*—David Hamaoui
(74) *Attorney, Agent, or Firm*—Allan J. Lippa; Alleman Hall McCoy Russell & Tuttle LLP (57) ABSTRACT

Systems and methods are described for controlling engine operation of an engine that may be shut-down during engine idle stop conditions. The engine may include a high pressure direct injection fuel system. In one embodiment, a method comprises during at least a first fuel rail temperature below a threshold, automatically stopping engine operation during a selected engine idle stop condition; and during at least a second fuel rail temperature above the threshold, maintaining engine operation during the selected engine idle stop condition.

4 Claims, 5 Drawing Sheets

ENGINE AUTOSTOP AND AUTORESTART CONTROL

BACKGROUND AND SUMMARY

Vehicles may use engines that automatically shut-down during idle or stopped vehicle conditions, also known as engine idle stop conditions, to improve fuel efficiency and reduce emissions.

One approach to managing automatic engine shut-down operation is provided by U.S. Pat. No. 6,817,329. In this example, an automatic engine shut-down operation is disabled responsive to high engine coolant temperatures. After engine shut-down, under-hood temperatures may continue to rise for a period of time before cooling to near ambient temperatures, since the cooling system is not in operation after engine shut-down. When the under-hood temperature, as indicated by the engine coolant temperature, is already high before the engine is shut-down, it may rise to a level as to potentially cause damage to various engine components during the engine shut-down. Thus, by disabling automatic engine shut-down responsive to high engine coolant temperatures, overheating of engine components may be averted.

However, the inventors herein have recognized various issues with the above approach. In one example, an engine performing an automatic shut-down operation may utilize high pressure direct fuel injection. Herein, when shutting down the engine at high fuel rail temperatures, which may occur even at lower engine coolant temperatures, the fuel rail pressure may rise to a level higher than desired due to continued heating during the shut-down. Consequently, upon a subsequent engine start, fuel injection control accuracy may degrade due to the higher than desired fuel rail pressure combined with limits on the fuel injector dynamic range. The degraded control accuracy may then lead to rough restarts, increased emissions, and/or engine misfire.

In one approach, at least some of the above issues may be addressed by a method of controlling engine operation of an engine that may be shut-down during engine idle stop conditions, the engine including a high pressure direct injection fuel system, the method comprising: during at least a first fuel rail temperature below a threshold, automatically stopping engine operation during a selected engine idle stop condition, without a driver requesting engine shut-down, and during at least a second fuel rail temperature above the threshold, maintaining engine operation during the selected engine idle stop condition. By considering fuel rail pressure effects when automatically stopping engine operation, it may be possible to avoid conditions that result in undesirably high fuel rail pressure during subsequent restarts. For example, by disabling the automatic stopping under such conditions, degraded operation may be reduced even when engine coolant temperatures are below temperatures that can result in component degradation.

Further, at least some of the above issues may be addressed by another aspect of the disclosed method wherein, during the second fuel rail temperature above the threshold, fuel injection is continued until a fuel rail pressure falls below a threshold, and then the engine operation is automatically stopped. In this way, it is possible to delay engine shut-down until fuel rail pressures can be sufficiently reduced. Consequently, upon the subsequent restart, adequate fueling control can be achieved. In one example, by stopping the fuel pump, pressure can be reduced through continued injection and engine operation/combustion, thereby sufficiently lowering the fuel pressure to enable the engine shut-down operation. In this way, even if the fuel pressure rises during the shutdown due to the fuel's high temperature, accurate fueling can be achieved during the subsequent restart.

At least some of the above issues may be addressed by still another aspect of the disclosed method including adjusting operation of a subsequent restart based on a previous fuel rail temperature of the high pressure fuel rail before the automatic stopping of the engine during selected engine idle stop conditions. In this way, even if fuel rail pressure rises during the shut-down to affect fuel injection control on the restart, due to the engine being operated at higher output torque for example, larger injection pulse widths of the injectors may enable sufficiently accurate injection control. In one example, the additional torque output may be further captured to regenerate a battery's state of charge.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
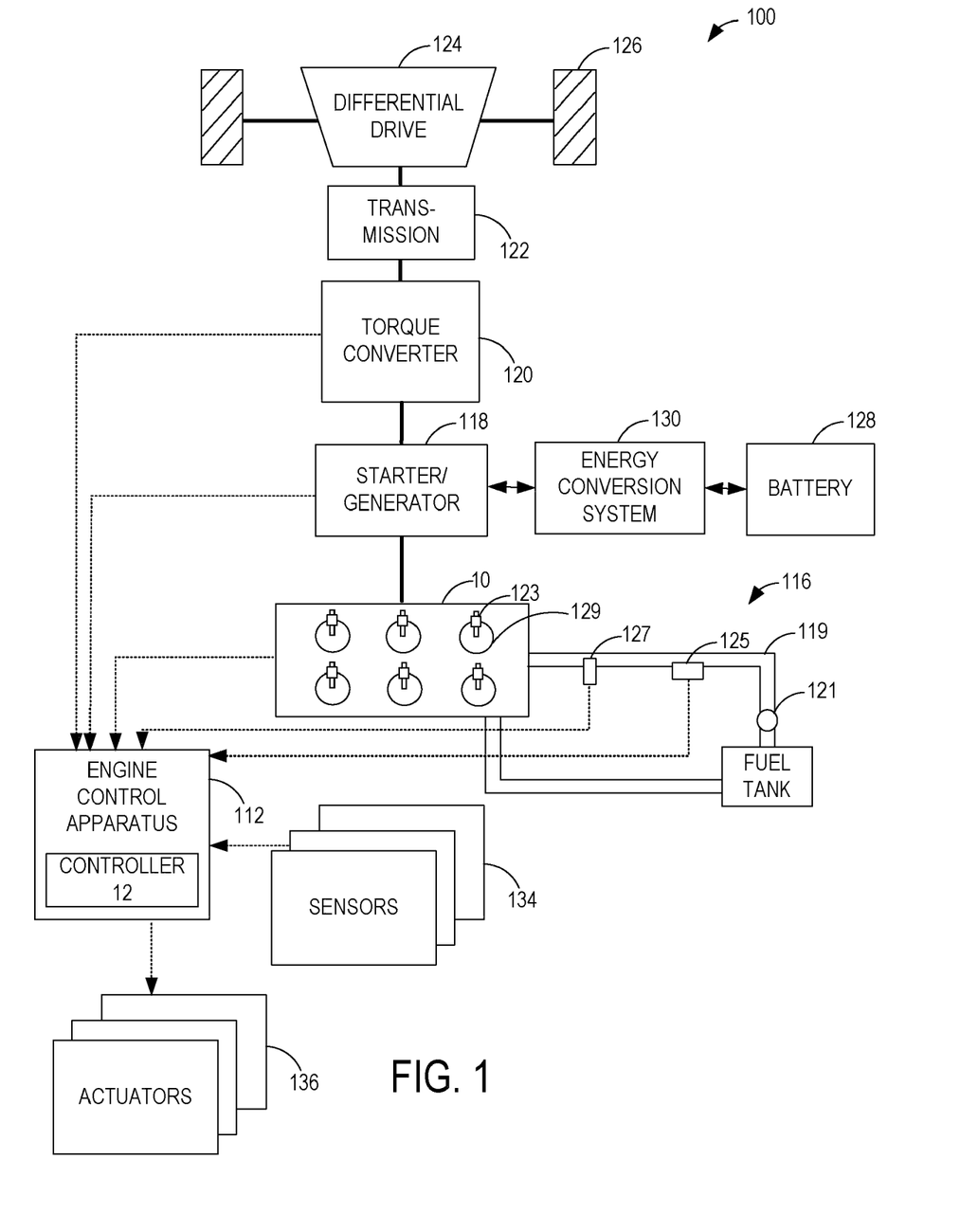
FIG. 1 is a diagram illustrating an example vehicle system.

FIG. 1 is a diagram illustrating an example vehicle system 100 which utilizes an engine control apparatus 112 for controlling engine operation of an engine 10 that may be shut-down during engine idle stop conditions. The example vehicle system 100 is shown as a parallel hybrid electrical vehicle system and the engine 10 of the vehicle system 100 includes a high pressure direct fuel injection fuel system 116. It will be appreciated that in alternate embodiments of vehicle system 100, other engine and vehicle configurations may be possible, for example, the vehicle system may be a series hybrid electrical vehicle system, or a non-hybrid electrical vehicle system, such as a gasoline vehicle system or a diesel vehicle system.

In the example vehicle system 100 shown in FIG. 1, the driving force of the vehicle system may be generated by the engine 10 and/or an electric motor of the starter/generator 118 coupled to the engine 10. The driving force to the driving wheels 126 (e.g., front wheels), from the engine 10 and/or the starter/generator 118 is provided via a torque converter system 120, a transmission system 122, and a differential drive system 124. The starter/generator 118 may be powered with electrical power supplied by battery 128. An energy conversion system 130 may be coupled between the starter/generator 118 and the battery 128 to convert the electrical power to a desired form, such as a desired voltage, current, and/or current type (e.g., AC or DC).

When the driving force provided by the engine 10 is not sufficient to meet a requested driving force, electrical power from the battery 128 may be used to supplement the engine 10 via the starter/generator 118. Alternatively, when the engine 10 is shut-down (for example during engine idle stop conditions), electrical power from the battery 128 may be used as the sole source of driving force. On the other hand, when the driving force provided by the engine 10 is in excess of a requested driving force, the excess driving force generated by the engine 10 may be converted to electrical power by the starter/generator 118 and stored in the battery 128. Similarly, at regenerative braking, the driving force may be transmitted from the driving wheels 126 back to the starter/generator 118 to be converted to electrical power and subsequently stored in the battery 128.

Continuing with FIG. 1, the high pressure direct injection fuel system 116 may include a high pressure fuel rail 119 for delivering fuel pressurized by a high pressure fuel pump 121, to direct fuel injectors 123 for injection into engine cylinders 129. The high pressure fuel rail 119 may include one or more fuel rail pressure sensors 125 for sensing fuel rail pressures and one or more fuel rail temperature sensors 127 for sensing fuel rail temperatures. Only one fuel rail pressure sensor 125 and one fuel rail temperature sensor 127 are shown for simplicity.

The engine control apparatus 112 of the vehicle system 100 may include an engine controller 12. The engine controller 12 may be coupled to various sensors 134 and may be configured to receive a variety of sensor signals from the various sensors 134. The sensors 134 may include a vehicle speed sensor, a throttle opening-degree sensor, an engine rotational speed sensor, a battery state of charge sensor, an ignition switch sensor, a brake switch sensor, a gear sensor, a driver request sensor, various temperature sensors, including engine coolant temperature sensor, fuel rail temperature sensor, intake temperature sensor, exhaust temperature sensor, and various pressure sensors, including a fuel rail pressure sensor. The engine control apparatus 112 may also be coupled to various actuators 136 of the vehicle system and may be further configured to control the operation of the various actuators 136, including the fuel injectors 123 and the fuel rail fuel pumps 121.

The engine control apparatus 112 may be further configured to automatically stop engine operation during selected conditions, such as an idle condition for example, without a driver requesting engine shut down. However, under high fuel rail temperature conditions, the fuel rail pressure may rise to an undesirably high level during the shutdown condition due to elevated rail temperatures. As such, the engine control apparatus may adjust the automatic engine stopping based on fuel rail temperature by performing one or more of routines 200-400 for example, such as described herein with regard to FIGS. 2-4.

Figure 2:
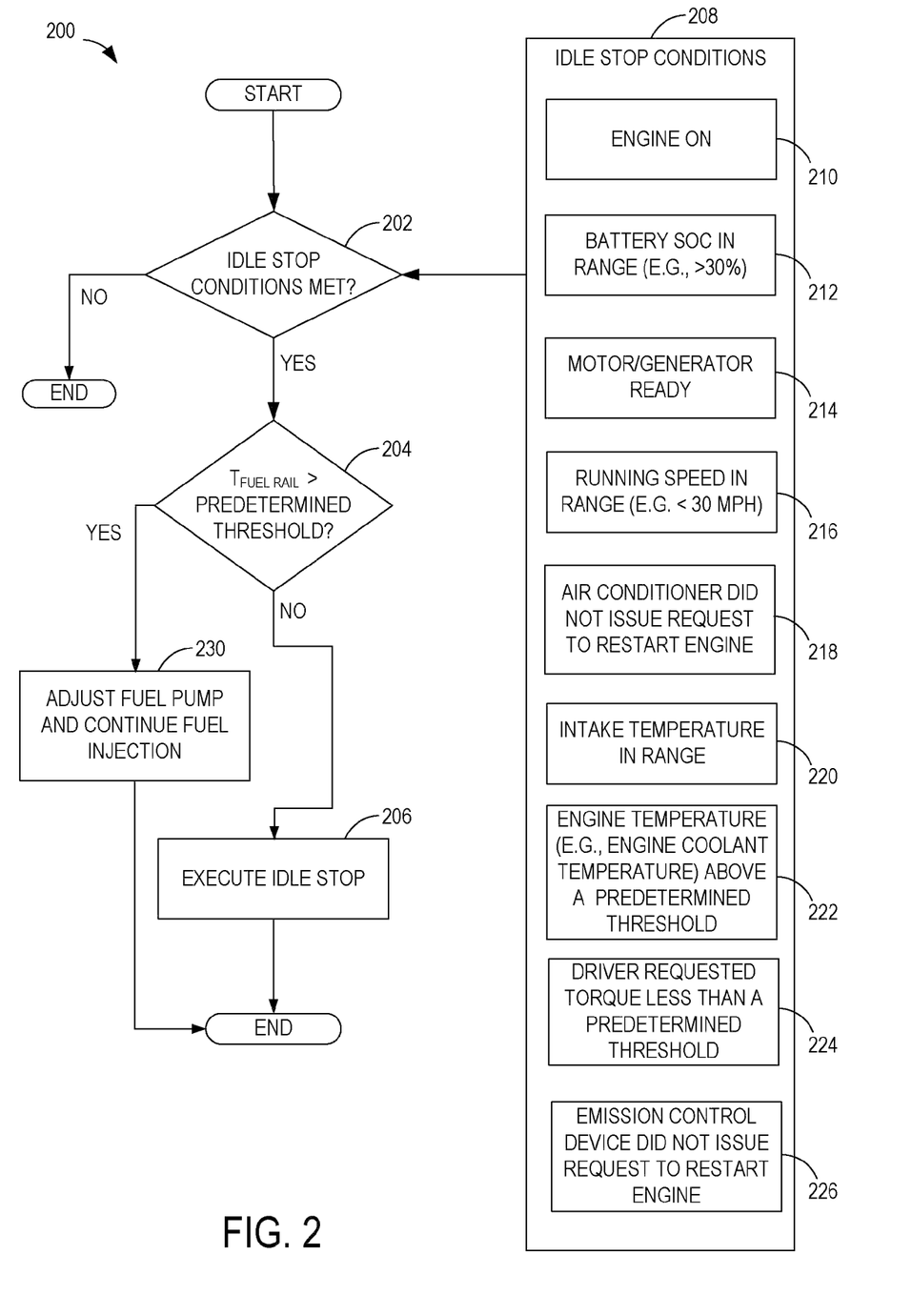
FIGS. 2, 3, 4A and 4B are high-level flowcharts illustrating example operations according to the present disclosure.

Referring now specifically to FIG. 2, routine 200 may include, at 202, confirming that idle stop conditions 208 are present. The idle stop conditions specified at 208 may include, for example, at 210 that engine 10 is operating (e.g., carrying out combustion). At 212, the state of charge (SOC) of battery 128 may be checked against a preset minimum threshold. In one example, it may be desired that the SOC of battery 128 be at least more that 30% charged to enable automatic engine shutdown. At 214, it may be indicated that the motor of starter/generator 118 is operation ready. At 216, it may be verified that the vehicle running speed is within a desired range. In one example, the desired range may be no more that 30 mph. At 218, the status of an air conditioner may be checked and it may be verified that the air conditioner did not issue a request for restarting the engine 10, as may be requested if air conditioning is desired. At 220, the intake air temperature is estimated and/or measured to determine if it is within a selected temperature range. In one example, the intake temperature may be estimated via a temperature sensor located in the intake manifold. At 222, the engine temperature may be estimated and/or measured to determine if it is within a selected temperature range. In one example, the engine temperature may be inferred from an engine coolant temperature and an engine idle stop condition may be selected when the engine coolant temperature is above a threshold. At 224, the driver requested torque may be estimated to indicate that it is less than a predetermined threshold value. At 226, an emission control device coupled to the exhaust manifold of engine 10 may be analyzed to determine that no request for engine restart was made.

If the idle stop conditions are not met at 202, then the routine may end. If idle stop conditions are met at 202, routine 200 may adjust engine operation prior to shut-down by first assessing fuel rail temperature ($T_{fuel\ rail}$) conditions, at 204, against a predetermined threshold. The estimated fuel rail temperature conditions may be indicative of potential fuel rail pressure constraints. The fuel rail temperature may be estimated by fuel rail temperature sensor 127, for example. During a condition of a fuel rail temperature below the predetermined threshold, at 206, an automatic idle stop may be executed, thereby automatically stopping engine operation during the selected engine idle stop condition, without a driver requesting engine shut-down. By enabling the automatic stopping when all idle stop conditions are met, and by further enabling the automatic stopping when fuel rail temperature conditions are below a threshold, over-heating of engine components and/or over-pressure fuel rail conditions during idle stop may be averted.

During the condition of a fuel rail temperature above the threshold, at 230, engine operation may be maintained while reducing operation of the fuel pump 121. This may include adjusting operation of the high pressure fuel pump 121 for pressurizing the high pressure fuel pump while continuing fuel injection into the engine cylinders. In one example, the fuel pump may be stopped. In another example, at low engine power, the fuel pump may be adjusted to achieve a lower pressure across the injectors, thereby enabling finer control over the mass of fuel injected. It will be appreciated that in alternate embodiments, the pressure reduction may be achieved through a dumping mechanism, such as via a dump valve, configured into the high pressure pump controller. Further, the automatic stopping of the engine may be disabled. However, it will be appreciated that in the event of a driver-requested engine shut down, even during the fuel rail temperature above the threshold, engine operation may be stopped.

Alternatively, reduced fuel pump operation and fuel injection may be continued until the fuel rail pressure falls below a threshold, following which the engine may be automatically stopped. Thus, by continuing fuel injection with the fuel pump turned off responsive to a fuel rail temperature above the threshold, fuel rail pressure above threshold conditions associated with fuel rail temperature above threshold conditions, may be addressed. In this way, by considering fuel rail pressure effects when automatically stopping engine operation, it may be possible to avoid conditions that result in undesirably high fuel rail pressure during subsequent restarts.

In an alternative embodiment, rather than follow the operations at 230, the routine may maintain engine operation, including fuel pump operation, to continue idle operation, without automatically shutting down the engine. The engine idle operation may be maintained until fuel rail temperature falls below the threshold at 204.

The engine control apparatus 112 may be further configured to automatically restart engine operation during selected conditions, such as after an idle stop, for example. However, upon restart under high fuel rail temperature and pressure conditions, fuel injection control accuracy at small injection amounts may be degraded. As such, the engine control apparatus 112 may adjust the automatic engine restart based on the current fuel rail temperature by performing routine 300 for example, such as described herein with regard to FIG. 3.

Figure 3:
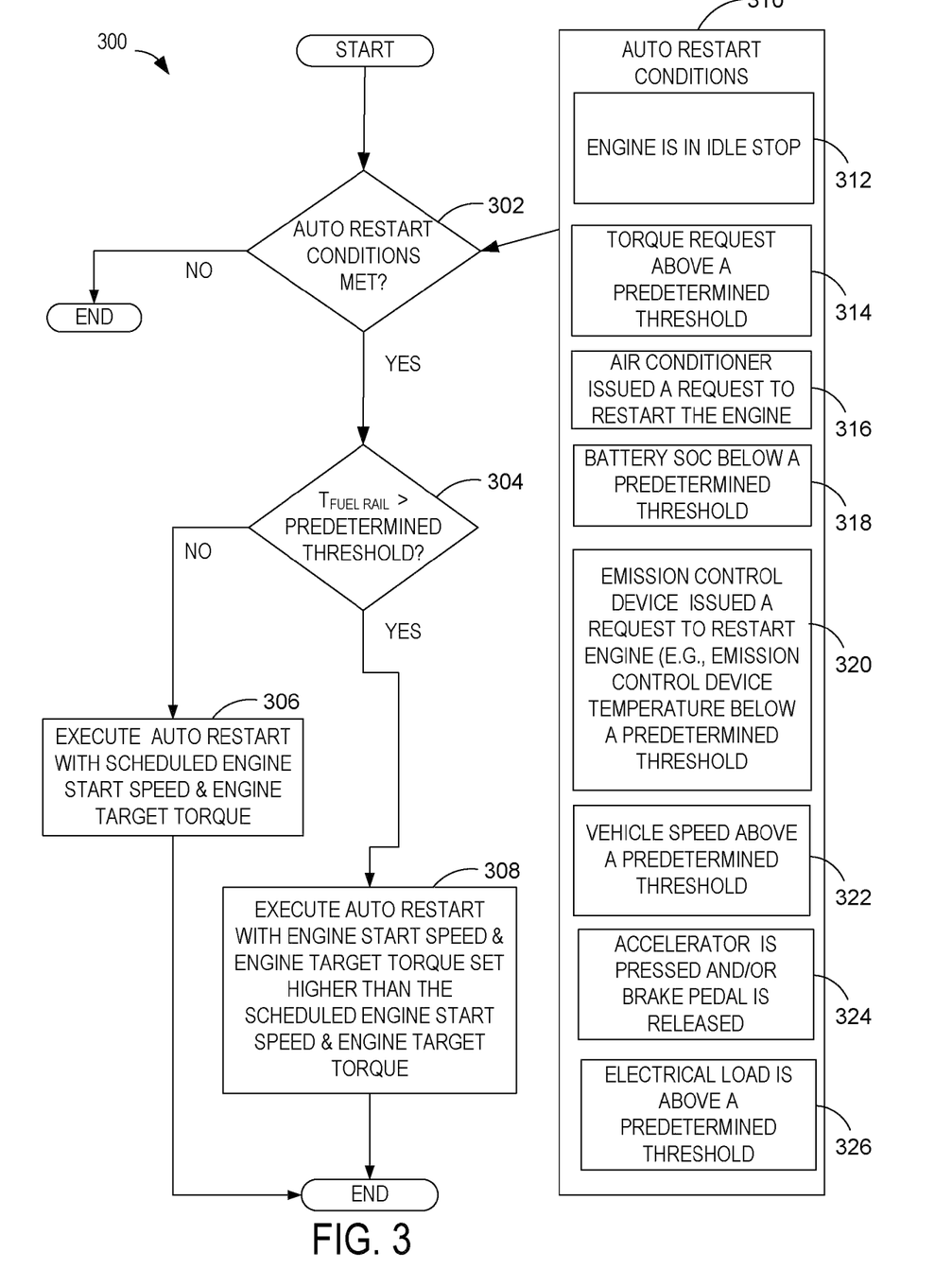

At 310, automatic restart conditions may be specified. These may include, at 312, verifying that the engine 10 is currently in idle stop status. At 314, the torque requested by the driver may be estimated and it may be indicated that it is above a predetermined threshold. At 316, the status of the air conditioner may be checked to verify whether a request has been made to restart, as may be made when air conditioning is desired. At 318, the SOC of battery 128 may be estimated to indicate that it is below a predetermined threshold. In one example, it may be desired that battery 128 be at least 30% charged. Accordingly, engine starting may be requested to charge the battery to a desired value.

At 320, the emission control device may be monitored to verify whether a request to restart the engine has been made. In one example, the emission control device temperature may be estimated and/or measured by a temperature sensor, and if the temperature is below a predetermined threshold, an engine restart may be requested. At 322, the vehicle speed may be estimated and assessed whether it is above a predetermined threshold. For example, if the vehicle speed is greater than a small threshold (e.g., 3 mph) an engine start may be requested. At 324, the accelerator pedal position may be determined, for example by reading a pedal position sensor, to determine whether the accelerator pedal has been engaged, and/or a brake pedal has been released. Finally, at 326, it is determined whether the electrical load of the engine 10 is above a predetermined threshold, in response to which an engine start is requested (e.g., to reduce draining of the battery 128). In one example, the electrical load may comprise user operated accessory devices, electrically powered air-conditioning, etc.

Once the automatic restart conditions have been specified, the routine 300 may include, at 302, verifying that the automatic restart conditions are met. If the conditions are not met, the routine may end and the idle stop status of the engine may be maintained. If, however, the conditions are met, then at 304, the fuel rail temperature ($T_{fuel\ rail}$) may be estimated and/or determined, for example by fuel rail temperature sensor 127, and it may be determined whether the temperature is above a predetermined threshold value. If the temperature is not above the threshold value, then at 306, an automatic restart condition is executed with a first scheduled engine start speed and a first target engine torque.

In contrast, if a fuel rail over-temperature condition is determined, then at 308, the automatic restart may be executed with an engine start speed and/or an engine target torque set higher than the first scheduled values, in anticipation of consequent high fuel pressure related fuel injection constraints. In one example, both the engine start speed and the engine torque may be set higher than the first scheduled values. In another example, the engine may be set to a power level, such as via a fuel injection mass flow rate setting, higher than the first scheduled value. The engine target speed may then be held constant, in order to allow the idle speed and creep speed to remain consistent, while the torque setting alone may be increased to achieve a similar increase in power.

In particular, fuel injection quantities may be controlled by varying pulse width of the fuel injector current pulses, which may have a limited dynamic range. Upon restart, when the fuel rail pressure is too high (e.g., above a threshold), as may occur when the fuel rail temperature is too high, the pulse width used to deliver small injection quantities may be so small that they are below the dynamic range of the fuel injectors, making it more difficult to achieve accurate fuel injection control. By executing an automatic restart with engine start speed set higher than the otherwise scheduled engine start speed, and/or with engine target torque set higher than the otherwise scheduled engine target torque (and responsive to fuel rail over-temperature conditions), the pulse width command for fuel injection may be shifted back into a more accurate range of the fuel injectors. In this way, a fuel rail pressure rise at the time of an automatic restart may be appropriately addressed without adversely affecting fuel injection control accuracy, thereby averting the likelihood of rough restarts, increased emissions, and increased misfires.

Figure 4A:
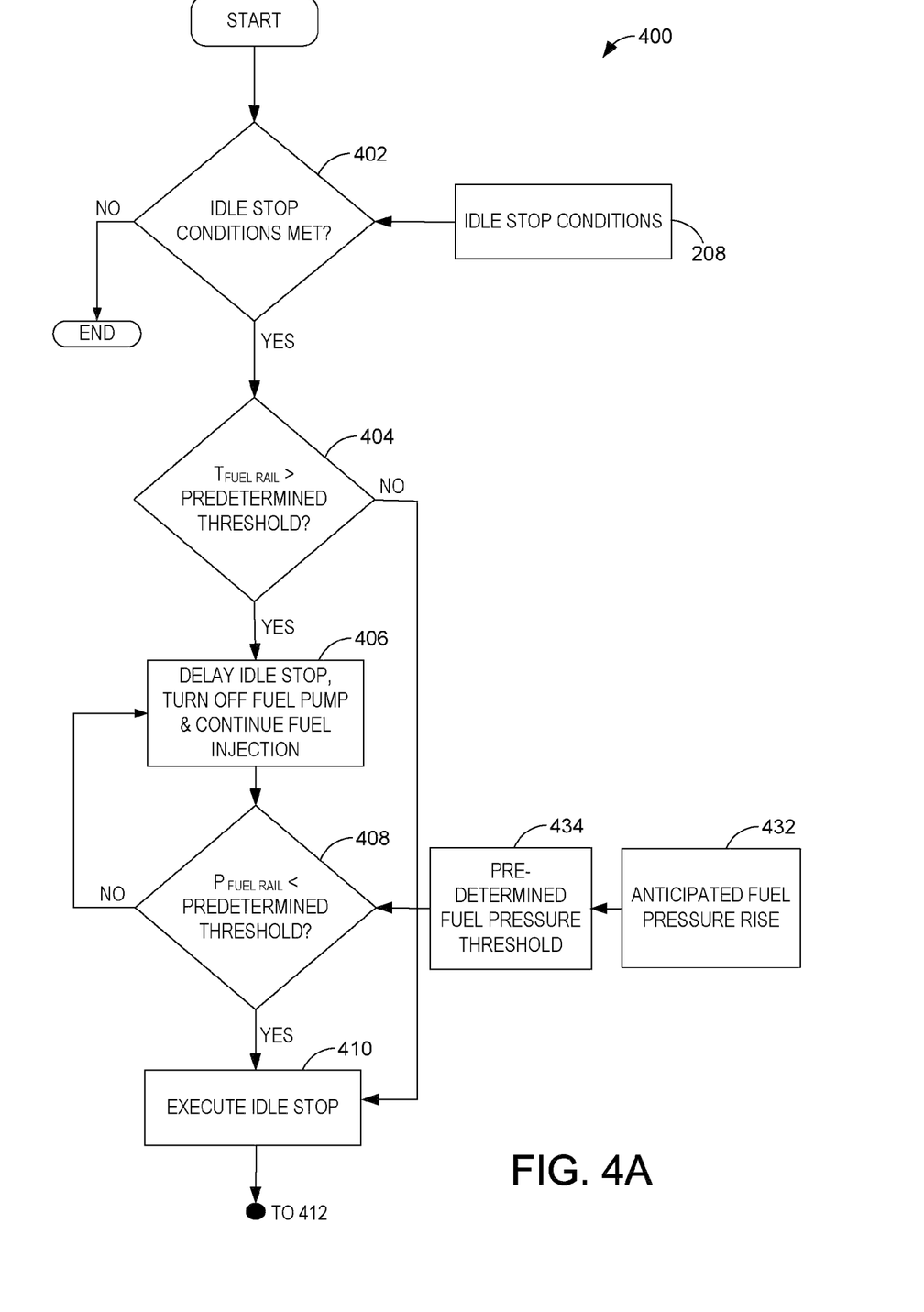
Figure 4B:
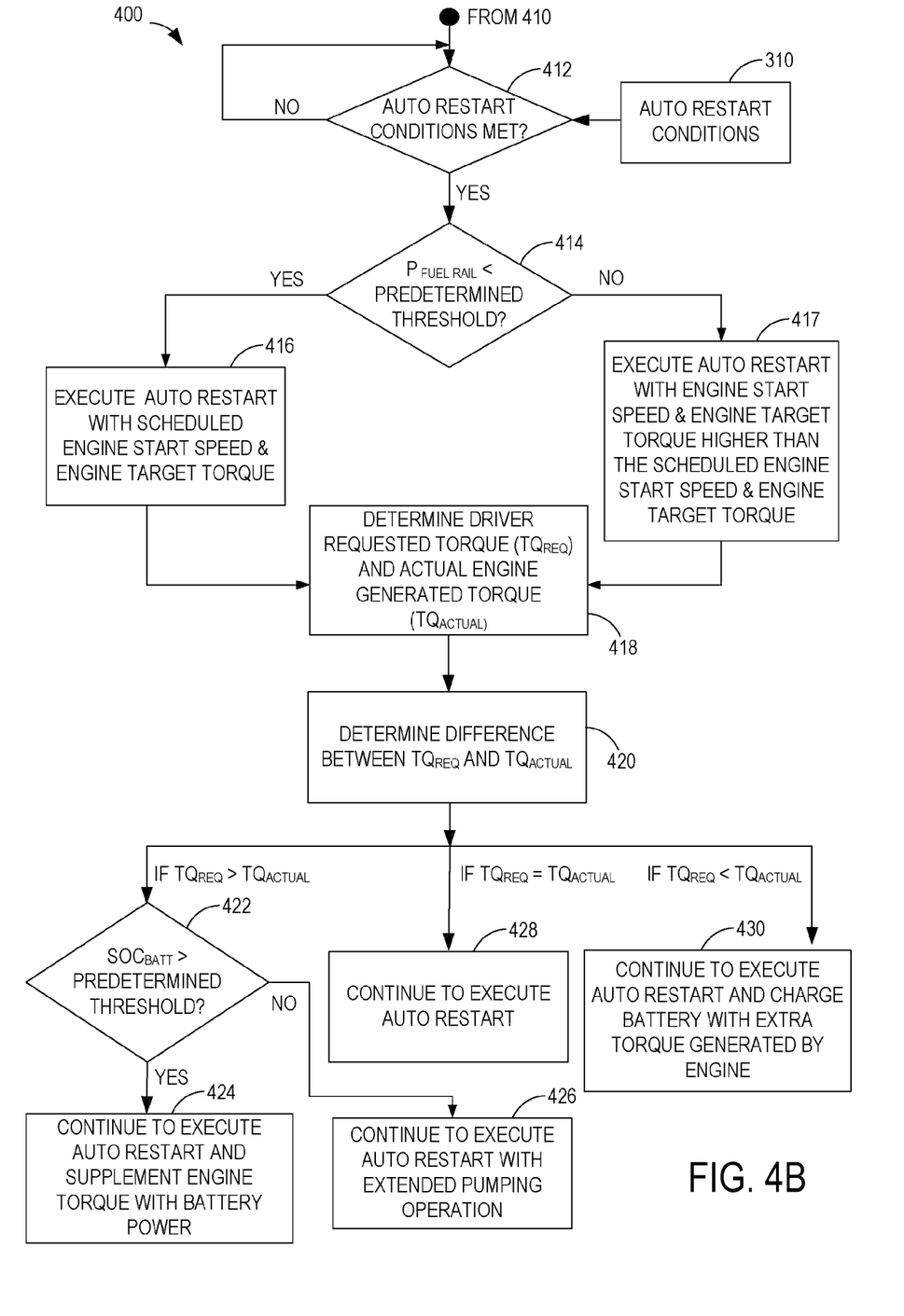

In an alternate embodiment, the engine control apparatus 112 may adjust operation of a subsequent automatic restart based on an estimated previous fuel rail temperature and pressure before the automatic stopping of the engine during the selected engine idle stop condition. The engine control apparatus 112 may be configured to first address a fuel rail temperature above threshold related high fuel rail pressure condition before executing the idle stop, and to accordingly further adjust operation of an immediately ensuing automatic restart. As such, even if a fuel rail pressure rises during the shut-down, fuel injection control may be achieved in a subsequent restart by performing routine 400, for example, such as described herein with regard to FIG. 4.

Referring now to FIG. 4, in routine 400, at 402, as in 202, it is verified whether the idle stop condition criteria, as previously elaborated at 208 (FIG. 2), have been met or not. If the criteria are not met, then the routine may end. If idle stop conditions are met, then at 404, the fuel rail temperature may be analyzed for over-temperature conditions. If the temperature is not above the predetermined threshold, then an automatic idle stop may be executed at 410, thereby stopping engine operation. In contrast, if at 404, the fuel rail temperature is above a predetermined threshold, then at 406, an automatic idle stop may first be delayed. Further, to address a consequent high fuel rail pressure condition associated with the fuel rail temperature above threshold condition, the fuel pump 121 may be disabled while the injector 123 may be directed to continue fuel injection. The continued fuel injection with fuel pump 121 turned off may allow fuel rail pressures to drop to a value within a preselected range.

At 408, the fuel rail pressure ($P_{fuel\ rail}$) may be monitored to verify that it has dropped below the predetermined threshold value. Additional pressure related input, such as regarding a predetermined fuel pressure threshold value (based on anticipated fuel pressure rise during engine off conditions) may be fed into routine 400 at 434 and 432 respectively. If the fuel rail pressure is not below the predetermined threshold value, then routine 400 may return to 406 and continue reducing fuel pump operation in addition to continuing fuel injection, until the fuel rail pressure falls below the threshold, following which the engine may be stopped automatically. However, if the fuel rail pressure is below the predetermined threshold value, then at 410, an idle stop may be executed directly. In this way, idle stop may be delayed until a fuel rail pressure has been reduced responsive to a fuel rail over-temperature condition.

Prior to a subsequent automatic restarting of the engine, at 412, routine 400 may include verifying whether the automatic restart conditions, as previously elaborated at 310 (FIG. 3) have been met or not. If the automatic restart conditions are not met, routine 400 may maintain idle stop status until the automatic restart conditions are met. If and when the automatic restart conditions are met, then at 414, the fuel rail pressure may be estimated and analyzed against a second predetermined threshold value. This second threshold value may be a minimum pump rail pressure value required for accurate fuel injection control. If the estimated fuel rail pressure is below the predetermined threshold value, that is if the fuel rail pressure is within an operation-ready range, then at 416, an automatic restart may be executed with a first scheduled engine start speed and a first target engine torque. However, in some circumstances, it may be possible that the engine has spent a large amount of time in the idle stop status and consequently, at the time of a subsequent automatic restart due to fuel rail temperature rise, the fuel rail pressure may have risen above the desired operation-ready range. If the fuel rail pressure estimated at 414 is not below the predetermined threshold value, then at 417, an automatic restart may be executed with a second engine start speed and a second engine target torque set higher than the first scheduled engine start speed and first target engine torque.

It will be appreciated that in an alternative embodiment of routine 400, a fuel rail temperature estimation may be made at 414 in lieu of a fuel rail pressure estimation, to determine whether the fuel rail temperature is below a predetermined threshold. As such, in case of a fuel rail temperature below the threshold, an automatic restart may be executed with the first scheduled engine start speed and the first target engine torque. Further, in case of a fuel rail temperature below the threshold, an automatic restart may be executed with the second higher engine start speed and the second higher engine target torque in anticipation of consequent high fuel pressure related fuel injection constraints. By restarting the engine with a higher engine start speed and a higher engine target torque at 417, the pulse width of subsequent fuel injections may be brought within the dynamic range of the fuel injectors, thereby improving fuel injection accuracy.

Both 416 and 417 may then lead to 418 where the driver requested torque value ($TQ_{REQ}$) and the actual engine generated torque value ($TQ_{ACTUAL}$) may be determined, and compared at 420 to determine the difference between the torque values.

In one scenario, if the driver requested torque value is higher than that actually generated by the engine, then at 422, the battery's 128 state of charge may be estimated to determine whether the value is above a predetermined threshold. If the battery is sufficiently charged, then at 424, the automatic restart may be continued and engine generated torque may be supplemented with battery torque to meet the driver's torque demand. If, however, the battery is not sufficiently charged, then at 426, the automatic restart may be continued with an extended fuel pumping operation before a first fuel injection to enable sufficient rail pressure to be achieved for the engine start.

In another scenario, if the driver requested torque value is equal to the torque generated by the engine, then at 428, the automatic restart may be continued. In yet another scenario, if the driver requested torque value is lower than that actually generated by the engine, then at 430, the automatic restart may be continued and further, the battery may be charged with the extra torque generated by the engine.

In this way, by adjusting operation of a subsequent restart based on the fuel rail temperature and/or pressure conditions estimated prior to a previous automatic engine stopping, during the selected idle stop conditions, fuel rail pressure rises during the previous engine idle stop may be adjusted such that adverse affects on fuel injection control accuracy during restart are reduced.

In this way, the engine controller of a hybrid electrical vehicle may be configured to adjust the operation of a subsequent restart based on a previous fuel rail temperature of the high pressure fuel rail before automatically stopping the engine by automatically starting the engine with an increased engine speed and output torque if the previous fuel rail temperature is above a predetermined threshold value while automatically starting the engine and with a decreased engine speed and output torque if the previous fuel rail temperature is below a predetermined threshold value. In this way, injection control accuracy during an automatic restart may not be affected by a fuel pressure rise during a previous automatic engine shut down. Furthermore, the additional torque output may be captured and stored for use at a later time. In one example, the energy may be captured and stored as electrical energy in the battery.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling engine operation of an engine that may be shut-down during engine idle stop conditions, the engine including a high pressure direct injection fuel system, the method comprising:

during at least a first fuel rail temperature below a threshold, automatically stopping engine operation during a selected engine idle stop condition without a driver requesting engine shut-down and restarting the engine at a first engine output torque amount; and during at least a second fuel rail temperature above the threshold, automatically stopping engine operation during the selected engine idle stop condition without the driver requesting engine shut-down and restarting the engine at a second engine output torque amount greater than the first engine output torque amount.

2. The method of claim 1, further comprising charging a battery with the increased engine output torque, thereby maintaining desired idle speed in both conditions.

3. The method of claim 1, wherein during the at least a second fuel rail temperature above the threshold, increasing fuel pulse widths of fuel injectors compared to fuel pulse widths of fuel injectors during the at least a first fuel rail temperature below the threshold, thereby enabling accurate fuel injection control.

4. The method of claim 1, wherein during the at least a second fuel rail temperature above the threshold, reducing the second engine output torque amount once fuel rail pressure decreases.

* * * * *